Nov. 16, 1954
G. C. PETRENCHAK
2,694,508
ELECTRIC GREASE GUN
Filed Oct. 17, 1951
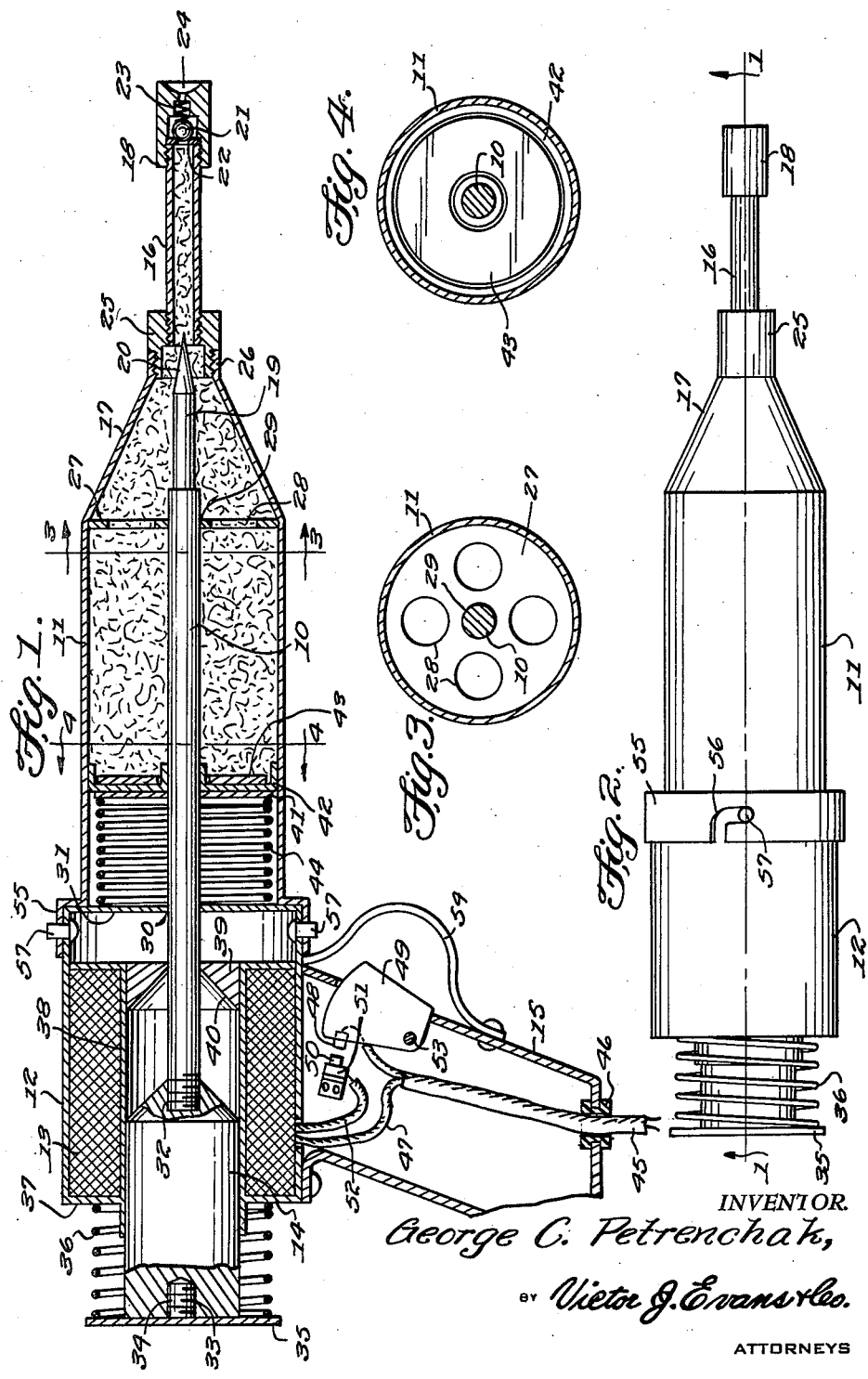
INVENTOR.
George C. Petrenchak,
BY Victor J. Evans & Co.
ATTORNEYS

United States Patent Office 2,694,508
Patented Nov. 16, 1954

2,694,508

ELECTRIC GREASE GUN

George C. Petrenchak, Seattle, Wash.

Application October 17, 1951, Serial No. 251,783

2 Claims. (Cl. 222—123)

This invention relates to grease guns particularly of the type used for injecting grease into fittings and joints of motor vehicles, and in particular a grease gun having a plunger actuated by a solenoid with a trigger for completing a circuit to the solenoid and with a nipple chuck adapted to be positioned on a grease fitting of a motor vehicle or the like wherein as the trigger is pulled a charge of grease is forced by the plunger through the nipple and into the fitting.

The purpose of this invention is to provide a grease gun with a positive action whereby a charge of grease may be applied with force and wherein the device is actuated with comparatively little effort.

Grease guns have been provided of various types and designs and with the conventional type, which is actuated with compressed air, it is difficult to place the nipple chuck over a fitting as the fittings are not readily accessible and where the grease gun is actuated by hand it is difficult to exert sufficient pressure, particularly in cold weather, to drive the grease into the fitting. With this thought in mind this invention contemplates a grease gun having an electromagnet or solenoid therein whereby with the plunger of the grease gun provided with a core the plunger may be driven into the small nipple or fitting behind the chuck with force and with a positive action when a circuit to the solenoid is completed by a trigger in a pistol grip of the grease gun.

Furthermore, with the grease gun actuated with compressed air it is necessary to have a supply of compressed air when the gun is used.

The grease gun of this invention may be connected to and actuated by a battery of a motor vehicle so that the grease gun may be carried in the vehicle and readily connected to the battery for use.

The object of this invention is, therefore, to provide an improved solenoid actuated grease gun whereby the average owner of a motor vehicle may readily apply grease to the Alemite or grease fittings of the vehicle.

Another object of the invention is to provide means for forming a grease gun so that a grease ejecting plunger of the gun may readily be actuated by the battery of the vehicle.

A further object of the invention is to provide an electric or solenoid actuated grease gun which is of a simple and economical construction.

With these and other objects and advantages in view the invention embodies a cylindrical housing or barrel having a solenoid positioned in a casing on one end and in which the opposite end tapers to provide a support for a nipple having a chuck on the outer end, a plunger longitudinally positioned in the barrel and having a core on one end positioned to be drawn by the solenoid for actuating the plunger, and a trigger positioned in a pistol grip on the casing and adapted to complete a circuit to the solenoid.

Other features and advantages of the invention will appear from the following description taken in connection with the drawings wherein:

Figure 1 is a longitudinal section through the improved electric grease gun, said section being taken on line 1—1 of Figure 2.

Figure 2 is a plan view of the gun.

Figure 3 is a cross section through the barrel of the gun taken on line 3—3 of Figure 1.

Figure 4 is a cross section through the barrel of the gun taken on line 4—4 of Figure 1.

Referring now to the drawings wherein like reference characters denote corresponding parts the improved electric grease gun of this invention includes a plunger 10 longitudinally mounted in a barrel 11, a casing 12 removably attached to one end of the barrel and having a solenoid 13 therein positioned to actuate the core 14 on the end of the plunger, a pistol grip 15 extended from one side of the casing and a tube 16 extended from a conical shaped section 17 on the end of the barrel 11 and having a chuck 18 on the outer end.

The plunger is formed as illustrated in Figure 1 with a piston 19 having a conical shaped point 20 thereon extended from one end and with the plunger positioned as shown in Figure 1, the piston 19 is positioned to enter the tube or nipple 16 whereby as the plunger is actuated by the solenoid 13 the piston drives grease in the tube 16 through the coupling or chuck 18 which is threaded on the outer end of the nipple 16 and which is provided with a ball check valve 21 wherein the ball thereof is retained against an opening in a washer 22, which provides a valve seat, by a spring 23. The outer end of the chuck 18 is provided with an outwardly flared or conical shaped opening 24 that facilitates positioning the chuck over an Alemite or grease fitting.

The opposite end of the tube 16 is threaded into a coupling 25 and the coupling is threaded into a hub 26 on the end of the section 17 of the barrel 11. The barrel 11 is provided with a partition 27, having openings 28 therein, and the plunger 10 is slidably mounted in an opening 29 in the center of the partition.

The opposite part of the plunger 10 extends through an opening 30 in a partition 31 forming the end of the casing 12 and this end of the plunger is threaded into a socket 32 of the core 14. The opposite end of the core 14 is provided with a threaded socket 33 to which a stud 34 of a disc 35 is threaded. A spring 36 is positioned on the core 14 between the end 37 of the casing 12 and the disc 35 whereby as a circuit to the solenoid 13 is broken the spring 36 withdraws the plunger to the position shown in Figure 1.

The casing 12 is provided with an inner cylindrical section 38 around which the solenoid 13 is positioned and a washer 39 having a conical shaped socket 40 therein is positioned in the end of the inner cylindrical section 38. The socket 40 is positioned to receive the end of the solenoid 14 and provides a seat therefor as the solenoid reaches the end of its travel.

The barrel 11 is provided with a traveling piston 41 against which a cup shaped washer 42 is held by a washer 43. The piston 41 is resiliently held by a spring 44 whereby as grease is used from the interior of the barrel 11 the spring moves the piston forwardly continuously feeding grease into the tube 16 as the plunger is withdrawn.

Electric current is supplied to the solenoid 13 by a cord 45 which extends through a ferrule 46 in the outer end of the pistol grip 15 and with one wire 47 of the cord extended to one end of the solenoid 13 the opposite wire is extended to a contact 48 on a trigger 49, the contact 48 being positioned to engage a contact 50 on a clock 51, and the contact on the block 51 being connected to the opposite end of the solenoid 13 by a wire 52.

The trigger 49 is pivotally mounted in the pistol grip 15 by a pin 53 and a guard 54 is provided over the trigger.

The barrel 11 is provided with an enlarged annular flange 55 that nests over the end of the casing 12, as illustrated in Figure 2. The flange 55 is provided with bayonet slots 56 that are positioned to receive pins 57 extended from the outer surface of the casing. By this means the barrel is readily removed from the casing for refilling thereby the barrel may be removed, packed with grease, and replaced on the casing in a comparatively few minutes.

With the parts arranged in this manner and with grease positioned in the barrel 11 the nipple chuck 18 is placed over a grease fitting on various types of machinery, such as motor vehicles, trucks, tractors and the like and with the chuck in position the trigger 49 is drawn inwardly whereby the contact 48 engages the contact 50 and the circuit is completed to the solenoid 13 which draws the core 14 toward the chuck, and the grease is injected into the fitting.

It will be understood that a chuck or connector of a different type or design may be used on the end of the grease gun and it will also be understood that other means may be used for completing a circuit to the solenoid.

The electric cord or cable 45 extends to a suitable source of electric current, such as a battery of a vehicle, or to an electric circuit.

It will be understood that modifications may be made in the design and arrangement of the parts without departing from the spirit of the invention.

What is claimed is:

1. A grease gun comprising a casing having a nipple chuck extended from one end, a plunger in the casing positioned to feed grease from the casing to said chuck, a solenoid mounted in the casing and positioned to actuate the plunger for feeding the grease to the chuck, a disc on the outer end of the plunger, resilient means on the plunger outwardly of one end of the casing intermediate of the disc and casing for returning the plunger to normal position, an extended tube mounted on the opposite end of the casing and said nipple chuck is mounted at the outer end of said tube, a piston on said plunger extending into said tube, a pistol grip on said casing, and a trigger is positioned in said pistol grip for completing a circuit to the solenoid.

2. In a grease gun, the combination which comprises a casing having a pistol grip extended at one side, a barrel removably attached to one end of the casing and extended therefrom, a nipple extended from the extended end of the barrel, a chuck carried by the extended end of the nipple, a plunger slidably mounted in the casing and extended through the barrel, said plunger having a piston on the extended end thereof, said piston positioned to extend into the nipple extended from the end of the barrel, a solenoid positioned in the casing, a core carried by the plunger and positioned to be actuated by the solenoid for driving the piston on the end of the plunger into the said nipple to feed grease through the chuck on the end thereof, the said core extending from the end of the casing, a disc on one end of said core, a spring positioned around the core and between the end of the casing and the disc on the core for returning the plunger when the circuit to the solenoid is broken and a trigger in the pistol grip of the casing for completing the circuit to the solenoid.

References Cited in the file of this patent

UNITED STATES PATENTS

| Number | Name | Date |
|---|---|---|
| 1,704,179 | De Forest | Mar. 5, 1929 |
| 1,949,497 | Stafford | Mar. 6, 1934 |
| 2,410,692 | Strobell | Nov. 5, 1946 |
| 2,626,085 | MacKinnon | Jan. 20, 1953 |